(12) United States Patent
Lynen et al.

(10) Patent No.: US 7,214,342 B2
(45) Date of Patent: May 8, 2007

(54) METHOD OF MAKING A COMPOSITE SILICON CARBIDE

(75) Inventors: Arthur Lynen, Willich (DE); Rinn Guenter, Lahnau (DE)

(73) Assignee: Schunk Ingenieurkeramik GmbH, Willich (DE)

(*) Notice: Subject to any disclaimer, the term of this patent is extended or adjusted under 35 U.S.C. 154(b) by 0 days.

(21) Appl. No.: 10/897,422

(22) Filed: Jul. 23, 2004

(65) Prior Publication Data
US 2006/0019816 A1    Jan. 26, 2006

(51) Int. Cl.
*C04B 35/64* (2006.01)
*C04B 35/565* (2006.01)

(52) U.S. Cl. .............. 264/682; 264/660; 264/676

(58) Field of Classification Search .............. 264/682, 264/29.1, 660, 674, 676
See application file for complete search history.

(56) References Cited

U.S. PATENT DOCUMENTS

| | | | |
|---|---|---|---|
| 4,041,117 A | 8/1977 | Prochazka | |
| 4,525,461 A | 6/1985 | Boecher et al. | |
| 4,536,559 A | 8/1985 | Kennedy et al. | |
| 4,690,909 A | 9/1987 | Okono et al. | |
| 4,692,418 A * | 9/1987 | Boecker et al. | 501/90 |
| 4,701,426 A * | 10/1987 | Okuno et al. | 501/90 |
| 4,942,145 A | 7/1990 | Moehle et al. | |
| 5,015,522 A * | 5/1991 | McCullough et al. | 428/312.2 |
| 5,422,322 A | 6/1995 | Chen et al. | |
| 5,486,496 A | 1/1996 | Talbert et al. | |
| 5,538,649 A * | 7/1996 | Demendi et al. | 508/101 |
| 5,543,368 A | 8/1996 | Talbert et al. | |
| 5,656,563 A | 8/1997 | Chen et al. | |
| 5,707,567 A * | 1/1998 | Pfaff | 264/29.7 |
| 5,976,429 A | 11/1999 | Chen et al. | |
| 6,398,991 B1 * | 6/2002 | Brazil et al. | 264/29.1 |
| 6,716,800 B2 * | 4/2004 | Demendi et al. | 508/107 |
| 2003/0195122 A1 | 10/2003 | Demendi et al. | |

* cited by examiner

*Primary Examiner*—Carlos Lopez
(74) *Attorney, Agent, or Firm*—Dennison, Schultz & MacDonald

(57) ABSTRACT

A method for manufacturing a silicon carbide composite body and includes the steps of forming a slurry including silicon carbide and a carbonaceous precursor, adding to the slurry composite granules containing a carbonaceous binder and carbon black, drying the slurry, shaping the dried slurry and sintering the dried and shaped slurry at a temperature of at least 2000° C. to form a body containing silicon carbide and non-graphitic carbon. The invention further relates to the composite body formed and the mixture prior to sintering.

18 Claims, No Drawings

METHOD OF MAKING A COMPOSITE SILICON CARBIDE

FIELD OF THE INVENTION

The invention relates to a composite body of silicon carbide and non-graphitic carbon, and to the process of making such a composite body. More specifically, the invention is directed to the field of composite bodies for use in applications such as mechanical seals, bearings and other sliding or rubbing components, which require good durability and wear performance under difficult lubricating conditions.

DESCRIPTION OF RELATED ART

Graphite-containing silicon carbide bodies are known in the art for use in demanding tribological applications such as seals and bearings. The production of such bodies is well known in the art, disclosed for example in U.S. Pat. Nos. 4,536,449, 4,525,461, 4,701,426, 4,690,909, 4,942,145, 5,543,368, 5,486,496, 4,041,117, 5,422,322, 5,656,563, and 5,976,429.

Pressureless sintering has been used for the production of these graphite containing bodies. However, in pressureless sintering, the bodies are subject to linear shrinkage, which can be as much as 17 percent. As a result of this shrinkage, the use of a non-shrinking carbon such as graphite will either inhibit the densification process or yield structural defects. In order to incorporate graphite into a dense silicon carbide matrix, the particle size of the graphite must be kept small concentration of the graphite must be minimized. Techniques utilizing carbonaceous binder graphite composite granules instead of graphite have been reported in the prior art.

Published U.S. Application 2003/0195122 proposes a composite body of silicon carbide having binderless, allotropic carbon granules of a size in the range of 5 to 500 μm distributed throughout. These bodies are produced by sintering silicon carbide with binderless, carbon-yielding precursor granules, particularly in the presence of a carbon-yielding organic compound.

SUMMARY OF THE INVENTION

The invention is an improvement on the invention disclosed and claimed in published U.S. Application 2003/0195122, which is incorporated herein by reference. While the prior published application is directed specifically to a binderless body, Applicants have discovered that by utilizing a composite granules containing non-graphitic carbon with a carbon-yielding organic binder, it is possible to match the shrinkage of the carbon to the shrinkage of the silicon carbide by varying the filler to binder ratio. While non-shrinking carbon particles inhibit the densification process or yield structural defects, carbon particles with a high shrinkage are only weakly bonded in the structure. It can be shown that particles with a shrinkage of about 10% represent the best compromise between sintering properties of the SiC matrix and linking of the carbon particles into the structure.

The steps for producing the composite body include forming a mixture of silicon carbide and carbon-yielding precursor granules composed of non-graphitic carbon particles in a carbon-yielding binder, shaping and heating the mixture to form the desired composite body. Articles made according to the present invention can be produced in a variety of shapes for use in tribological applications such as mechanical face seals.

DETAILED DESCRIPTION OF THE INVENTION

According to the invention, it has been found that the characteristics of a self-sintered silicon carbide in friction applications, for example, in a mechanical face seals and bearings can be improved by incorporating carbon-yielding precursor granules such as lampblack and carbon black in a binder matrix of coal tar pitch, petroleum pitch or phenol formaldehyde resin. The carbon content of the final, fired product is thus composed of the original amorphous carbon and the carbon yield formed by decomposition of the binder in the precursor granules.

Articles made according to the invention can be produced in variety of shapes such as rods, tubes, plates, etc. for use in seals bearings, vanes, pistons, valve seats etc.

Silicon carbide composite bodies made according to the present invention may be produced according to any of a number of standard pressureless, self-sintered silicon carbide manufacturing processes.

For the invention, α-phase silicon carbide, produced by the Acheson process, is the preferred raw material. The α-silicon carbide contains a variety of different crystal structures with hexagonal and rhombohedral poly-types being the most predominant. The silicon carbide made by Acheson process can be green or black depending upon the type and amount of impurities. The green colored silicon carbide contains less impurities than the black. The major impurities in the black silicon carbide grains are aluminum, carbon and free silicon. While the preferred silicon carbide for the invention is the green type, the more abundant black silicon carbide can also be used. β-phase silicon carbide, amorphous silicon carbide, α-phase silicon carbide and mixtures thereof can also be used, and the silicon carbide can have spherical, ellipsoidal or irregular morphology.

The silicon carbide powder for the self-sintered process must have a fine particle size, predominantly in the sub-micrometer range. The surface area of the silicon carbide powder is preferred to be in the range of 5 to 15 $m^2/g$, as determined by the BET method. The coarse silicon carbide can be milled to the desired particle size range by standard ball milling technique, utilizing silicon carbide grinding media. However, further chemical purification may be required to remove impurities that inhibit the sintering process. The starting silicon carbide feed stock should be smaller than 100 μm to achieve economical milling throughput. Although the desired particle size of silicon carbide can be obtained commercially from a number of vendors, the milling process is the preferred method since it is possible to simultaneously mill and mix a desired amount of sintering aid, such as boron carbide, which is required for the pressureless self-sintering process. Elemental boron, aluminum, beryllium, carbon, and combinations thereof can also be used to catalyze the silicon carbide densification process. The preferred boron carbide concentration is about 0.5–2.0% by weight. The sub-micrometer boron carbide is available on a commercial scale from a number of vendors.

The silicon carbide having the desired particle size distribution contains a considerable amount of surface oxides. To facilitate sintering, these surface oxides can removed by reacting the powder with uncombined carbon.

It is preferred that the uncombined carbon is uniformly distributed over the surface of the silicon carbide particles. This can be achieved by adding a carbonaceous precursor to the silicon carbide powder. The preferred precursors are starch derivatives, lignosulfonates and phenol formaldehyde resins. The carbonaceous precursors will generally be added in an amount of 2 to 10% by weight. The carbonaceous precursor also facilitates the formation of a strong green body because it acts as a binder.

In order to facilitate the powder compaction process, an organic lubricating compound such as polyvinyl alcohol, oleic acid, acrylic resin, wetting agent, stearic acid, glycerine, mono-ethylene glycol, polyethylene glycol, paraffin wax, or fatty acids should be added to the batch. The concentration of this additive is in the range of 0.5 to 10% by weight based upon the silicon carbide content.

Key to production of the self-lubricating silicon carbide-carbon composite is the presence of carbon-yielding composite granules composed of amorphous carbon in a binder matrix. During the pressureless sintering, the linear shrinkage of the object produced can be as much as 18 percent. As a result of this shrinkage, incorporating non-shrinking carbon such as graphite will either inhibit the densification process or yield structural defects.

According to the invention, non-graphitic carbon can be incorporated into the silicon carbide matrix at a high concentration without structural defects by utilizing a carbonaceous binder-carbon black composite with binders such as tar pitch, bitumen and phenol-formaldehyde resins. The average particle size of the composite granules is in the range of 50 to 200 µm.

As a result of the sintering temperature exceeding 2000° C., the carbonaceous binder-carbon black composite granules will shrink and convert to non-graphitic carbon.

In general, the materials added to water to form the z slurry will comprise about 70–95 wt. % silicon carbide, 1–15 wt. % composite granules, 0.1–2% sintering aid, 2–10 wt. % carbonaceous precursor and 0.5–10 wt. % lubricants. A deflocculant-liquifier such as caustic soda solution (2M) may also be added to the slurry, for example in an amount of 1 wt. %. The weight of water used to form the slurry is about 45–90% of the weight of the additive materials; the total slurry is thus about 31–47 wt. % water.

The process for producing a self-sintered silicon carbide-carbon composite begins with the formation of a water slurry by addition to water, with stirring, of submicron boron carbide or other sintering aid, one or more carbonaceous precursors such as a water soluble phenol formaldehyde resin or starch derivative, fine silicon carbide powder, and an organic lubricating compound.

Since the ultrafine silicon carbide contains a considerable amount of surface oxides, one must add the carbonaceous precursor, which will pyrolyze to produce a carbon yield that reacts with the surface oxides. The preferred amount of precursor resin is in the range of 2 to 10% by weight.

The organic lubricating compound, preferably including a fatty acid such as stearic acid or oleic acid, may also added to the slurry in the range of 0.5 to 10%. The lubricating compound may be combined with a polyol such as glycerin or polyethylene glycol.

Then, the slurry as described above is mixed with the desired amount of the carbon-yielding granules discussed above and spray dried using standard spray drying technology, with the spray dried particles pressed into a desired shape.

Since the carbonaceous components must be heat treated under a protective gas such as nitrogen to obtain the desired amount of carbon content, and the sintering process is preferably conducted at reduced pressure, the coking and sintering processes are carried out separately in different equipment. First the green object is heat treated in an inert atmosphere to about 800° C. After this coking, the material can be machined if desired. Following the heat treatment and optional machining, the object is sintered under reduced pressure to facilitate the carbon-surface oxide reactions. The sintering is carried out initially in a vacuum. In a temperature range of 1200–1500° C., the kiln is filled with argon or helium to 100–900 mbar absolute pressure, and the kiln is heated under this atmosphere to a peak sintering temperature in the range of 2000 to 2200° C.

By adjusting the amount of carbon particles and binder in the composite particles, it is possible to obtain the desired amount of shrinkage in the particles produced. The following weight percentages have been experimentally determined for mixtures of carbon black and coal tar pitch, and similar ratios can be determined for other composite particles.

| Carbon black % | Pitch % | Shrinkage % |
| --- | --- | --- |
| 59% | 41% | 8.3 |
| 56% | 44% | 9.3 |
| 53% | 47% | 10.2 |
| 50% | 50% | 11.0 |
| 48% | 52% | 11.8 |
| 45% | 55% | 12.4 |
| 43% | 57% | 13.0 |
| 42% | 58% | 13.6 |
| 40% | 60% | 14.1 |

The invention will be described in greater detail in the following example, which is for illustrative purposes only and which is not intended to limit the scope of this invention.

EXAMPLE

A raw batch of the following composition by weight was made:

| | |
| --- | --- |
| caustic soda solution (2M) | 1% |
| boron carbide | 1% |
| glycerin | 2% |
| starch derivative (glucose syrup powder) | 4% |
| polyethylene glycol | 4% |
| silicon carbide | 80% |
| oleic acid lubricant | 1% |
| carbonaceous binder-carbon black composite | 7% |

The submicron silicon carbide powder had a BET surface area of 10 m$^2$/g, and a median particle size of 0.8 µm. A commercially available boron carbide was used, having a BET surface area of 15–20 m$^2$/g and a median particle size of 0.5 µm. The oleic acid based lubricant used in the composition was Zusoplast 126/3 from Zschimmer & Schwarz GmbH & Co., Lahnstein, Germany.

The carbonaceous composite was composed of 52.5% by weight carbon black and 47.5% by weight coal tar pitch. The carbon black itself was characterized by a DBP-value of approximately 100 and the coal tar pitch by a carbon yield of 75%. The carbon black and pitch were mixed in a double screw extruder under heating to achieve a uniform blend, followed by milling and screening to the range of 50–200 µm.

The above described ingredients were used to produce a 33 weight percent water based slurry. The ingredients were added in the order listed above to water with continuous stirring to produce the slurry. After mixing for one hour, the slurry was spray dried, and the spray dried powder was screened through a 0.2 mm screen to eliminate large particles.

Tubes were isostatically molded from this powder mixture at 2000 bar pressure. The molded tubes were cured under nitrogen to 800° C. and machined in the pyrolyzed state to the desired ring configuration. The rings were sintered in a vacuum to 2050° C., and the resultant parts had a density of 2.9 g/cm$^3$.

The non-graphitic nature of the carbon particles was obvious from processing the mixture of coal tar pitch and carbon black under identical conditions, and comparing the density of the resulting carbon with the density of other carbon and graphite materials. The carbonaceous composite used in the invention achieved a density of 2.00 g/cm$^3$ after firing to the sintering temperature of 2050° C. Graphite materials (natural and synthetic graphite, e.g. Timrex KS 6) have typical densities of 2.23–2.25 g/cm$^3$. Even petrol coke reaches a density of 2.05 g/cm$^3$ after calcination to 1200° C. These powder densities were obtained by helium pycnometry. The differences between the graphites and the non-graphitic carbon material would be even greater if the density were obtained in a medium with a larger molecular size (e.g. xylene), which does not penetrate to the extent of helium into the microporous, three-dimensional network of the non-graphitic carbon.

What is claimed is:

1. A method for manufacturing a silicon carbide composite body, comprising the steps of:
    forming composite granules comprising amorphous carbon in a carbonaceous binder matrix;
    forming a slurry from components comprising silicon carbide, a carbonaceous precursor, and the composite granules;
    drying the slurry;
    shaping the dried slurry; and
    sintering the dried and shaped slurry at a temperature of at least 2000° C. to form a body comprising silicon carbide and non-graphitic carbon.

2. The method of claim 1, additionally comprising adding a lubricant to the slurry or to the dried slurry.

3. The method of claim 2, wherein the lubricant is selected from the group consisting of polyvinyl alcohol, acrylic resin, wetting agent, glycerin, mono-ethylene glycol, polyethylene glycol, paraffin wax, fatty acids and mixtures thereof.

4. The method of claim 1, wherein the carbonaceous binder is selected from the group consisting of tar pitch, bitumen, phenol-formaldehyde resins and mixtures thereof.

5. The method of claim 1, wherein the carbonaceous precursor is selected from the group consisting of phenolic resins, lignosulfonates, starch derivatives and mixtures thereof.

6. The method of claim 1, wherein the sintering is pressureless sintering.

7. The method of claim 1, additionally comprising a step of heating the shaped mixture at a temperature of up to 800° C. under atmospheric pressure, followed by said sintering.

8. The method of claim 7, wherein the heating step takes place under a nitrogen atmosphere.

9. The method of claim 1, wherein said sintering comprises an initial sintering step under vacuum at a temperature of up to 1200° C., followed by a sintering step under an inert atmosphere at a temperature of at least 2000° C.

10. The method of claim 1, wherein the composite granules have an average size in the range of 50 to 200 μm.

11. The method of claim 1, additionally comprising adding to the slurry a sintering aid.

12. The method of claim 11, wherein the sintering aid is boron carbide.

13. The method of claim 1, wherein the carbonaceous precursor is present in an amount of 2–10% by weight of said components.

14. The method of claim 1, wherein the composite granules are present in an amount of 1–15 wt.% of said components.

15. The method of claim 1, wherein the slurry is formed by adding to water the components comprising 70–95 wt.% said silicon carbide, 1–15 wt.% said composite granules, and 2–10 wt.% said carbonaceous precursor.

16. The method of claim 15, wherein the components additionally comprise 0.1–2% sintering aid and 0.5–10 wt.% lubricants.

17. The method of claim 15, wherein the slurry comprises about 31–47 wt.% water.

18. The method of claim 1, wherein the amorphous carbon is carbon black.

* * * * *